(12) United States Patent
Hayden et al.

(10) Patent No.: US 9,897,066 B2
(45) Date of Patent: Feb. 20, 2018

(54) METHOD OF MAKING A ROOT END JOINT OF A WIND TURBINE BLADE AND A ROOT SEGMENT FOR SUCH A JOINT

(71) Applicant: Blade Dynamics Limited, Cowes, Isle of Wright (GB)

(72) Inventors: Paul Trevor Hayden, Cowes (GB); Peter Anthony Broome, Cowes (GB)

(73) Assignee: Blade Dynamics Limited, Cowes, Isle of Wright (GB)

( * ) Notice: Subject to any disclaimer, the term of this patent is extended or adjusted under 35 U.S.C. 154(b) by 457 days.

(21) Appl. No.: 14/261,224

(22) Filed: Apr. 24, 2014

(65) Prior Publication Data
US 2014/0234109 A1 Aug. 21, 2014

Related U.S. Application Data

(63) Continuation of application No. PCT/GB2012/000809, filed on Oct. 22, 2012.

(30) Foreign Application Priority Data

Oct. 25, 2011 (GB) .................................. 1118419.9

(51) Int. Cl.
*F03D 1/06* (2006.01)
*B29C 70/86* (2006.01)
(Continued)

(52) U.S. Cl.
CPC .............. *F03D 1/06* (2013.01); *B29C 70/083* (2013.01); *B29C 70/30* (2013.01); *B29C 70/865* (2013.01);
(Continued)

(58) Field of Classification Search
CPC ..... B29D 99/0028; F03D 1/06; F03D 1/0658; F03D 1/0675; F03D 3/062; F03D 3/064;
(Continued)

(56) References Cited

U.S. PATENT DOCUMENTS 4,260,332 A * 4/1981 Weingart ................ B64C 11/20
416/218
2005/0106029 A1 5/2005 Kildegaard
(Continued)

FOREIGN PATENT DOCUMENTS

EP 2341240 A1 7/2011
EP 2400147 A1 12/2011
(Continued)

OTHER PUBLICATIONS

International Search Report and Written Opinion dated Mar. 1, 2013 issued in International Application No. PCT/GB2012/000809, 13pgs.
Search Report dated Feb. 24, 2012 issued in UK Application No. GB1118419.9, 4 pgs.

*Primary Examiner* — William McCalister
(74) *Attorney, Agent, or Firm* — Dority & Manning, P.A.

(57) ABSTRACT

A method of making a root end joint for a wind turbine. A plurality of root segments (10) are formed of a composite material. Each has an arcuate end face (11) which subtends an angle of 90° or less and has a plurality of connection holes (12). The segments are joined together side-by-side to build up the circular profile of the root end. The segments include a proportion of uni-axial to multiaxial fiber which decreases from the arcuate end face towards the opposite end.

11 Claims, 4 Drawing Sheets

(51) Int. Cl.
  *B29D 99/00* (2010.01)
  *B29C 70/08* (2006.01)
  *B29C 70/30* (2006.01)
  *F03D 3/06* (2006.01)
  *B29K 101/10* (2006.01)

(52) U.S. Cl.
  CPC ....... *B29D 99/0028* (2013.01); *F03D 1/0658* (2013.01); *F03D 3/062* (2013.01); *F03D 3/064* (2013.01); *B29K 2101/10* (2013.01); *F05B 2230/50* (2013.01); *F05B 2230/60* (2013.01); *Y02E 10/721* (2013.01); *Y02E 10/74* (2013.01); *Y02P 70/523* (2015.11); *Y10T 29/49336* (2015.01)

(58) Field of Classification Search
  CPC ..... B29C 70/083; B29C 70/30; B29C 70/865; F05B 2230/50; F05B 2230/60; Y02E 10/721; Y02E 10/74; Y02P 70/523; Y10T 29/49336
  USPC .......................................................... 416/230
  See application file for complete search history.

(56) References Cited

U.S. PATENT DOCUMENTS

| | | |
|---|---|---|
| 2009/0226320 A1 | 9/2009 | Martinez |
| 2009/0252614 A1 | 10/2009 | Schibsbye |
| 2010/0084079 A1* | 4/2010 | Hayden ................ B29C 70/222 156/189 |
| 2010/0086409 A1* | 4/2010 | Whiley ................ F03D 1/0658 416/220 R |
| 2011/0318186 A1* | 12/2011 | Kristensen ........... F03D 1/0658 416/219 R |
| 2012/0045343 A1 | 2/2012 | Hancock et al. |
| 2013/0177440 A1* | 7/2013 | Zhang .................... C04B 41/52 416/241 R |

FOREIGN PATENT DOCUMENTS

| | | |
|---|---|---|
| FR | 2 863 321 A1 | 6/2005 |
| WO | WO 2007/073735 A1 | 7/2007 |
| WO | WO 2010/092168 A2 | 7/2007 |
| WO | WO 03/057457 A1 | 12/2011 |
| WO | WO 2013/061016 A1 | 5/2013 |

\* cited by examiner

METHOD OF MAKING A ROOT END JOINT OF A WIND TURBINE BLADE AND A ROOT SEGMENT FOR SUCH A JOINT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of Patent Cooperation Treaty International Patent Application PCT/GB2012/000809, filed Oct. 22, 2012, and entitled "A METHOD OF MAKING A ROOT END JOINT OF A WIND TURBINE BLADE AND A ROOT SEGMENT FOR SUCH A JOINT," which is incorporated by reference herein in its entirety, and which claims priority to United Kingdom Patent Application 1118419.9, filed on Oct. 25, 2011.

BACKGROUND

Field

The present invention relates to a method of making a root end joint of a wind turbine blade and a root segment for such a joint.

Description of the Related Art

Most modern day wind turbine blades are manufactured with either carbon or glass fiber reinforced plastic. As is well known in the art, at the root (hub) end of the blade, this is typically glass fiber combined with epoxy resin (and sometimes polyester, vinylester and polyurethane resin families). The typical manufacturing methods are vacuum resin infused or pre-preg methods.

The thickness of the laminate required at the root end can be very high when compared to some other parts of the wind turbine blade and is often in the range of 50 mm-80 mm thick but with more modern blades can be up to 150 mm thick. This high thickness can cause manufacturing problems. When the resin system is curing, it generates heat in an exothermic reaction. In the thick areas of the root, the heat generated can become so much that it causes damage with the finished component such that it cannot be used.

A typical method of forming the root end is shown in FIGS. 1A-1C. In this, the matrix of dry fabric is laid up in the mould of a suitable shape. The resin is then infused and cured to the finished part as shown in FIG. 1B).

Once the root component of the blade is cured, it is then typically transferred to a drilling location where a number of holes 4 are drilled in the end of the root laminate to allow metal root inserts with female screw threads to be bonded or mechanically fixed in place. Two semi-circular sub-assemblies are then joined together to make the finished root end joint as shown in FIG. 1c) US 2009/0226320, WO 2010/092168 and EP 2 341 240 all show similar arrangements where the roots are further broken down into quarter circle segments. Drilling of the holes is a time-consuming and expensive process and the amount of heat generated by the drilling must be carefully controlled so as not to damage the material. As the accuracy of drilling is very important, large jigs are required. Once the hole is drilled, the metallic insert is then bonded or mechanically held into position in the hole. The attachment of the root insert is very critical as these are very high load components and can be prone to failure.

FR 2 863 321 discloses a number of root segments which are imbedded within the end face of a wind turbine and each have a plurality of threaded inserts by virtue of which the blade is connected to the hub. A similar disclosure is contained in EP 2 400 147 published after the priority date of the present application.

SUMMARY

According to the present invention, there is provided a method of making a root end joint of a wind turbine blade, the method comprising forming a plurality of root segments of a composite material, each segment being generally the shape of a segment of a hollow cylinder having at least one arcuate end face subtending an angle of 90° or less with a plurality of connection holes and a pair of side faces extending axially from the arcuate end face, the method further comprising joining a plurality of the segments side-by-side; wherein the segments include uni-axial fibers and multi-axial fibers, wherein the relative proportion of uniaxial to multi-axial fiber decreases from the arcuate end face towards the opposite end.

By breaking the root end down into a number of smaller segments, a number of advantages arise. Firstly, as the segments are physically smaller, the uncured mass is reduced and the amount of heat generated is significantly reduced.

Also, as the holes can be made in smaller components, the handling during drilling is greatly simplified. The jigs required can be much smaller and more accurate. Also, if a mistake is made, only one small segment is wasted, rather than half of the root end.

Having a higher concentration of uni-axial fibers at the end with the holes increases the stiffness of the composite root section for load transfer purposes, while a high proportion of multi-axial fibers further down the segment improves the torsional strength of the segment in the region next to the joining region and provides a good bonding and shear connection to the rest of the blade.

As an alternative to drilling the connection holes after the root segments are formed, the method may comprise the step of forming the connection holes as the root segments are formed. One way of doing this is to form the root segments with inserts having female screw threads in situ. Alternatively, the root segments—may be formed with disposable inserts in situ.

Preferably, the adjacent side faces of adjacent segments have a complementary keying configuration. This provides quicker and more accurate location of the segments with respect to one another.

The segments may have a uniform cross-section from one end to the other. However, preferably, the thickness of the segment tapers from the arcuate end face towards the opposite end. This allows the segments to be blended gradually into the surrounding material of the blade.

The segments are preferably joined together to form a substantially semi-circular configuration. This then subsequently allows them to be handled in a manner of a conventional root segment which is formed as a one-piece semi-circular configuration.

The joined segments are then preferably attached to the root end of a wind turbine blade. They are preferably attached to the root end by lamination. This preferably takes the form of placing the segments into a root tool and forming adjoining portions of the blade by adding additional layers of lamination to the tool to join the segments and build up the root end of the blade. By doing this, the laminate effectively forms a very long scarf joint between the segments and the root end. This ensures a very strong bond without requiring the external fixings.

If necessary, inserts having screw threads may be inserted into the connection holes. If these are inserted before the segments are joined, the segment can be "pre-certified" as an individual component thereby greatly simplifying the downstream assembly and certification process.

The angle subtended by the arcuate segment is preferably 60° or less and more preferably 45° or less.

The present invention also extends to a root segment for the root end joint of a wind turbine blade, the segment being made of a composite material having the general shape of a segment of a hollow cylinder, having at least one arcuate end face subtending an angle of 90° or less, with a plurality of connection holes and a pair of side faces extending axially from the arcuate end face; and uni-axial and multi-axial fibers, wherein the relative proportion of the uni-axial to multi-axial fibers decreases from the arcuate end face towards the opposite end.

This segment has the advantage that it can be used in the above method, thereby facilitating the assembly of a root end joint.

The angle subtended by the arcuate and face is preferably 60° or less and more preferably 45° or less.

Preferably, the side faces of the segment have a keying configuration enabling one side of one segment to key with the opposite side of an adjacent segment of the same construction.

Preferably, the thickness of the segment tapers from the arcuate end face to the opposite end.

Preferably, root inserts having female screw threads are fixed into the connection holes.

BRIEF DESCRIPTION OF THE DRAWINGS

An example of a method and a segment in accordance with the present invention will now be described with reference to the accompanying drawings, in which.

DETAILED DESCRIPTION

Figure 1A:
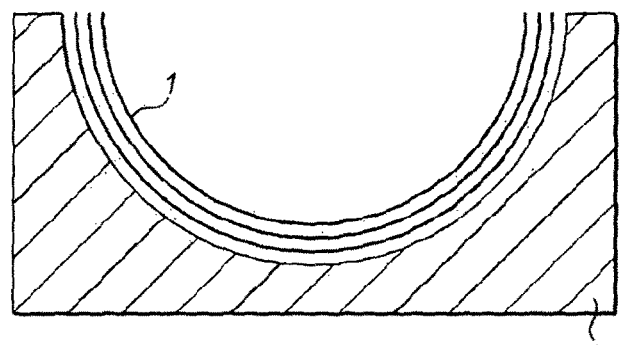
FIGS. 1a) to 1c) are schematic representations of the method of assembly of a conventional wind turbine root end joint.
Figure 1B:
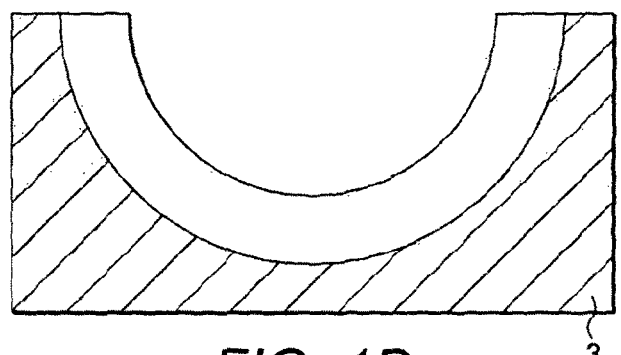
Figure 1C:
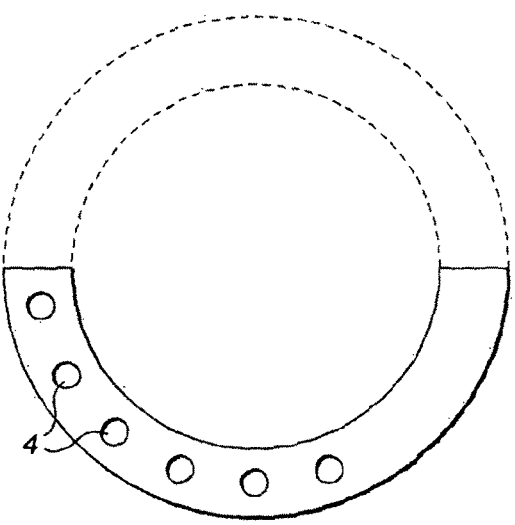
Figure 2:
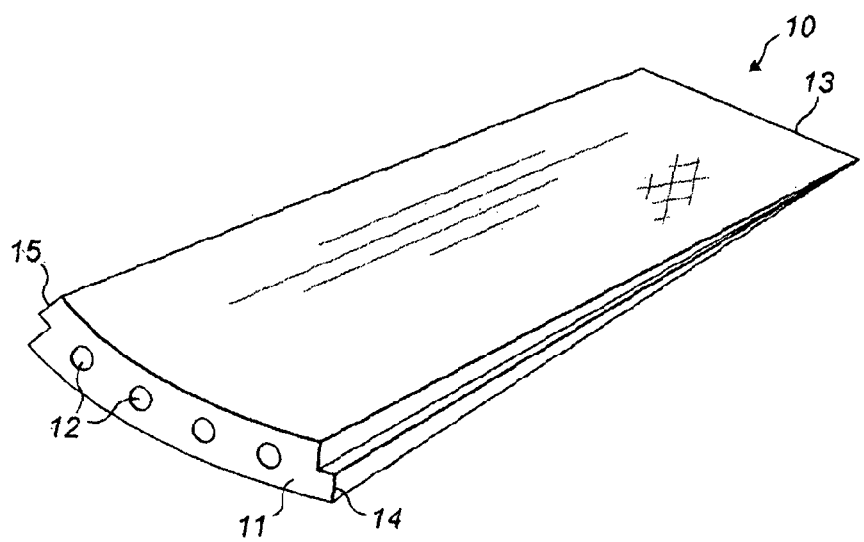
FIG. 2 is a perspective view of a segment according to the present invention.

A number of segments as shown in FIG. 2 are used to construct a root end joint by a wind turbine. Each of the segments 10 has a connection end 11 into which a plurality of holes 12 are formed and an opposite end 13. The segment has the general shape of segment of a hollow cylinder which tapers in thickness from the connection end 11 to the opposite end 13. In general, it is intended that 16 segments (8 in each half) will be connected together to form the complete the root end. In this case, each segment will subtend an angle of 22.5° at the centre of the hub.

However, there may be as few as 4 such segments (2 in each half) subtending an angle of 90°, or more than 16 segments for larger blades which will subtend a correspondingly smaller angle.

Each side of the segment, is a key 14, 15 designed to locate and interlock with the corresponding key on an adjacent segment.

Typically, each segment will be 2000 mm long and 500 mm wide. At the connection end, there is a significant amount of uni-directional fiber with a small percentage of bi-axial fiber. The amount of fiber moves towards the opposite end 13 where it ends up being 1 ply layer thick.

Depending on its application (infusion or pre-preg blade root), the root segment is made in one of two ways.

For an infusion blade, it can be made by wet lamination with vacuum, vacuum resin infusion, resin transfer moulding or similar process. The first layers of the fiber are laid into the tool, then metallic inserts or tubular spacers are placed into the tool and held in position with an alignment frame at the end of the tool. The alignment frame allows the accurate positioning of the inserts. The final layers of fiber are then placed into the tool. The whole lay-up is then placed under vacuum and the resin is either infused or injected and then fully cured.

For a pre-preg blade, the process is very similar, except that layers of pre-preg are inserted into the tool instead of the layers of fiber. The pre-preg layup is then placed under vacuum and partially cured such that it becomes a semi-cured pre-form.

Alternatively, the segments can be made without the inserts or spacers 16 and the holes are drilled in a subsequent step in a separate jig.

Once the individual root segments are made, they can undergo a quality assurance process to assess the structural integrity of the segments and also to assess the integrity of the inserts.

The inserts may be conventional metallic inserts that are well known in the art. Alternatively, they may be the inserts disclosed in our earlier WO 2010/041008.

Figure 3A:
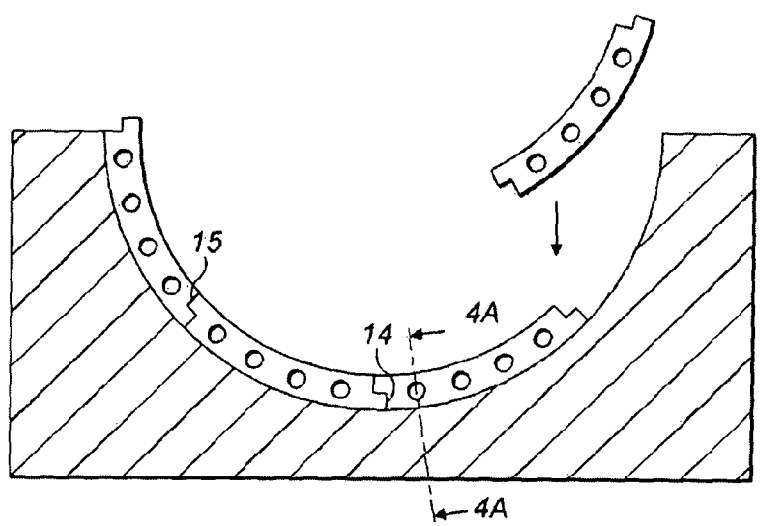
FIGS. 3a) to 3c) are schematic representations of the method of assembly according to the present invention.
Figure 3B:
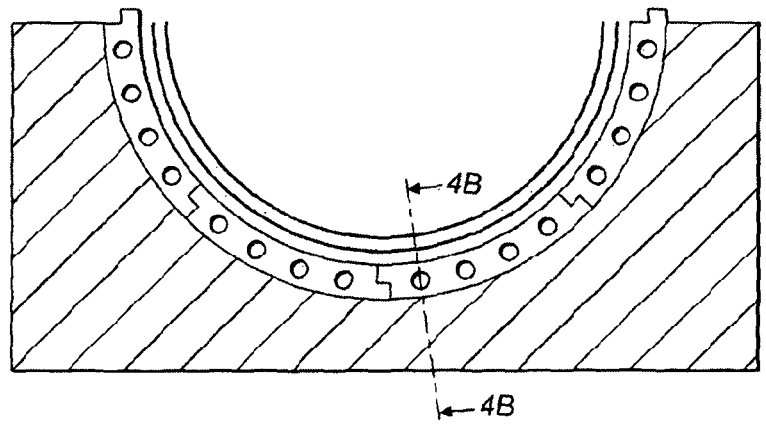
Figure 3C:
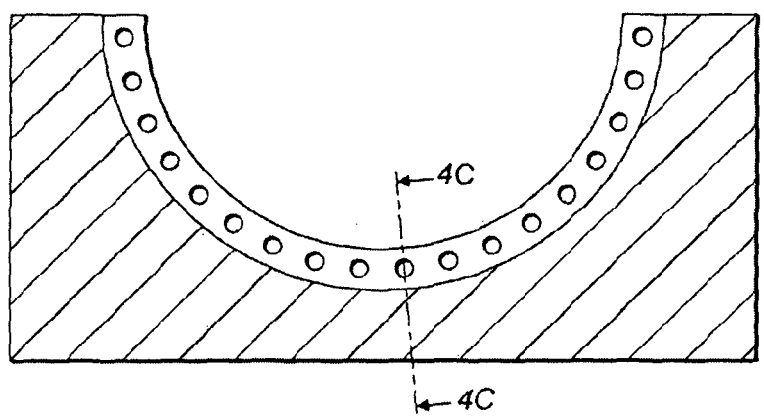

The assembly of the root end joint is shown in FIGS. 3a) to 3c) and 4a) to 4c).

Figure 4A:
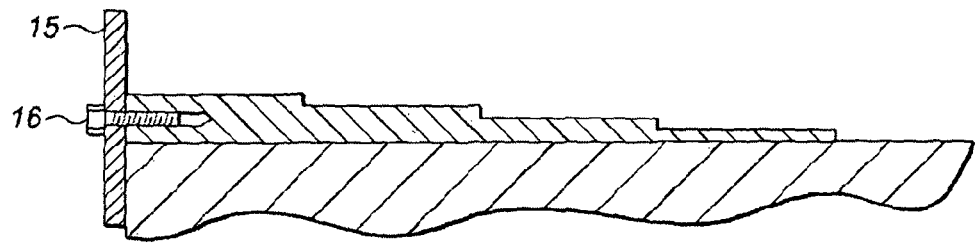
FIGS. 4a) to 4c) are cross-sectional views aligned to 4a) to 4c) respectively in FIGS. 3a) to 3c).
Figure 4B:
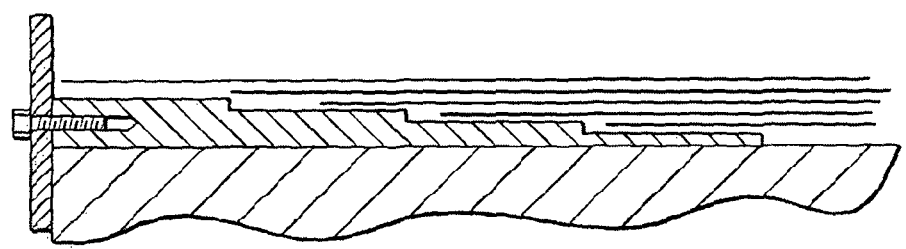
Figure 4C:
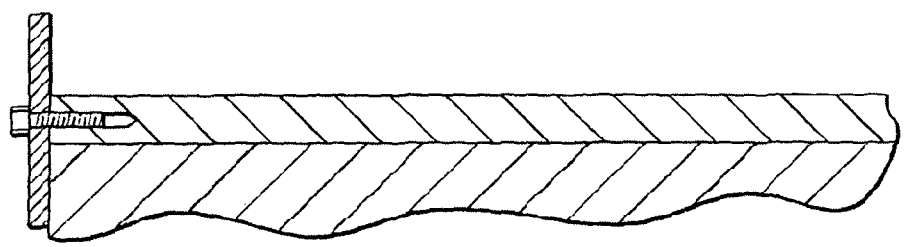

In FIG. 3(a), four segments are shown to make up one half of the root end joint. In practice, there will typically be eight. The segments are placed in a tool having a generally semi-circular configuration prior to any other laminate being placed into the tool. The root end of the insert is connected to an alignment frame 15 as shown in FIGS. 4a) to 4c) and are bolted in place using bolts 16. This ensures that the alignment of the bolt circle is maintained during the manufacturing process. In step b), once the segments are accurately positioned, the rest of the blade laminate is laid up. The laminate effectively forms a very long scarf joint with the tapering laminate in the root segment. Once all of the laminate has been laid up, the blade is placed under vacuum and is infused with resin (if it is an infusion blade) or is simply cured (if it is a pre-preg blade). The blade half is then complete ready for final assembly of the two blade halves as normal.

What is claimed is:

1. A method of making a root end joint of a wind turbine blade, the method comprising:

forming a plurality of root segments of a composite material, each root segment being generally the shape of a segment of a hollow cylinder having at least one arcuate end face subtending an angle of 90° or less with a plurality of connection holes, an opposite end, and a pair of side faces extending axially from the arcuate end face to the opposite end;

arranging a plurality of the root segments side-by-side into a root tool, wherein the root segments include uniaxial and multi-axial fibers, wherein the relative proportion of uni-axial to multi-axial fiber decreases from the arcuate end face towards the opposite end, and wherein each root segment comprises a fixed length between the arcuate end face and the opposite end;

aligning the connection holes of the arranged root segments with through holes of an alignment frame that abuts against the root tool;

securing the arranged root segments to the alignment frame via a plurality of bolts positioned through the aligned connection holes and through holes;

laying up a plurality of laminate layers atop the fixed lengths of each root segment; and securing the laminate layers and the root segments together so as to form the root end joint.

2. A method according to claim 1, wherein adjacent side faces of adjacent root segments have a complementary keying configuration.

3. A method according to claim 1, wherein a thickness of the fixed lengths of the root segments tapers from the arcuate end face towards the opposite end.

4. A method according to claim 1, wherein the root segments are joined together to form a substantially semicircular configuration.

5. A method according to claim 1, further comprising drilling the connection holes after the root segments are formed.

6. A method according to claim 1, further comprising forming the connection holes as the root segments are formed.

7. A method according to claim 6, wherein the step of forming the connection holes is achieved by forming the root segments with inserts having female screw threads in situ.

8. A method according to claim 6, comprising the steps of inserting disposable inserts into the root segment during the forming step and removing the disposable inserts to form the connection holes.

9. A method according to claim 3, further comprising laying up the plurality of laminate layers atop the tapering fixed lengths of each root segment until a thickness of the root end joint is uniform.

10. A method according to claim 1, wherein securing the laminate layers and the root segments together so as to form the root end joint further comprises infusing the laminate layers and the root segments together via at least one resin material.

11. A method according to claim 1, wherein securing the laminate layers and the root segments together so as to form the root end joint further comprises curing the laminate layers and the root segments together.

* * * * *